No. 634,292. Patented Oct. 3, 1899.
W. E. GIBBS.
CLUTCH FOR MOTOR VEHICLES.
(Application filed Feb. 8, 1899.)

(No Model.) 2 Sheets—Sheet 1.

Witnesses.
M. V. Bidgood
W. P. Hammond

Inventor.
William E. Gibbs
By Smith & Wood
Attys

THE NORRIS PETERS CO., PHOTO-LITHO., WASHINGTON, D. C.

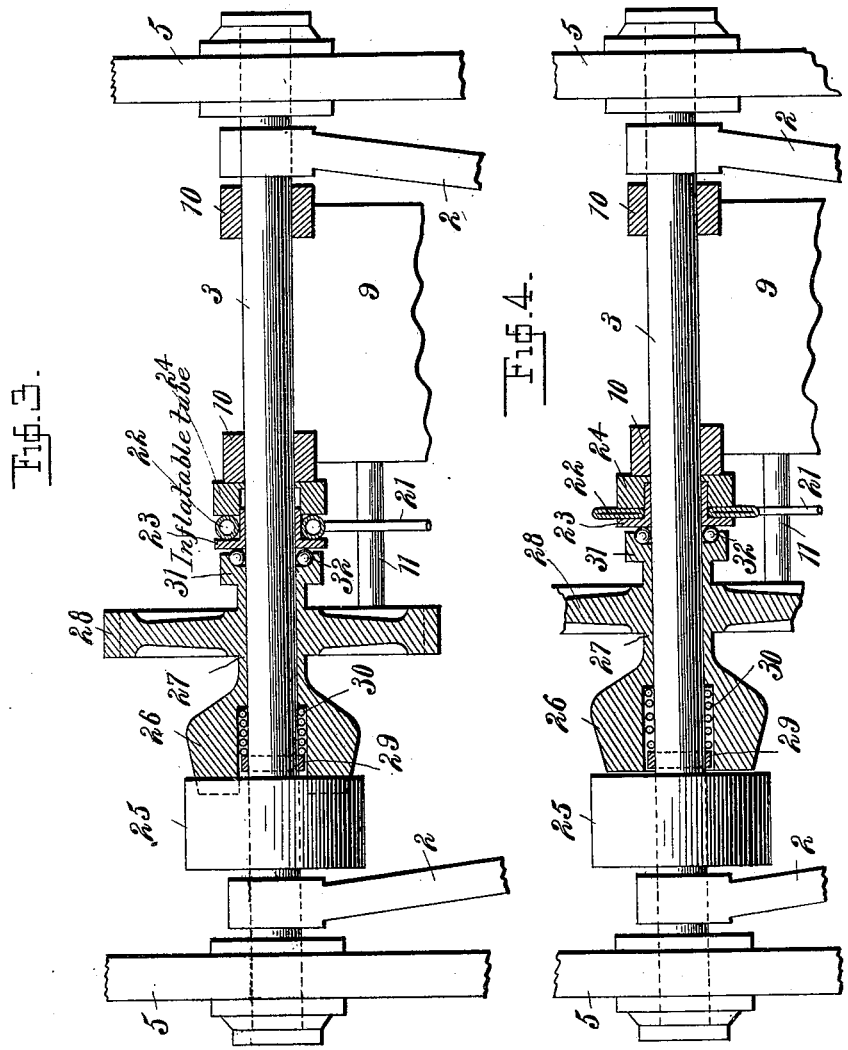

UNITED STATES PATENT OFFICE.

WILLIAM E. GIBBS, OF FANWOOD, NEW JERSEY, ASSIGNOR TO THE PNEUMATIC CARRIAGE COMPANY, OF NEW YORK, N. Y.

CLUTCH FOR MOTOR-VEHICLES.

SPECIFICATION forming part of Letters Patent No. 634,292, dated October 3, 1899.

Application filed February 8, 1899. Serial No. 704,905. (No model.)

*To all whom it may concern:*

Be it known that I, WILLIAM E. GIBBS, a citizen of the United States, residing at Fanwood, in the county of Union and State of New Jersey, have invented certain new and useful Improvements in Clutches for Motor-Vehicles, of which the following is a specification.

The object of my invention is to provide an automatic clutch for fluid-pressure motors which will be thrown into gear automatically by the opening of the valve which controls the supply of fluid to the motor.

My invention is particularly applicable to motor-vehicles, the clutch which gears the motor to one axle of the vehicle being normally opened and adapted to be automatically thrown into gear by the pressure of the fluid when the valve is opened for starting the motor. I mount a sliding clutch upon the driving-axle of the vehicle, and between a stationary collar on the axle and the movable part of the clutch I place an inflatable tube which is connected by a small pipe with the fluid-pressure-supply pipe at a point between the throttle-valve and the motor. When the motor is not operating, the inflatable tube will be collapsed and the spring of the clutch will hold the clutch in disengaged position, allowing the driving-axle of the vehicle to rotate freely for coasting. When the motor is started by opening the throttle-valve, the fluid-pressure from the supply-pipe will inflate the tube and cause it to throw the clutch into operative position, the result of which will be the gearing of the driving-axle to the motor.

In order that my invention may be fully understood, I will first describe the same with reference to the accompanying drawings and afterward point out the novelty with more particularity in the annexed claims.

Figure 1:
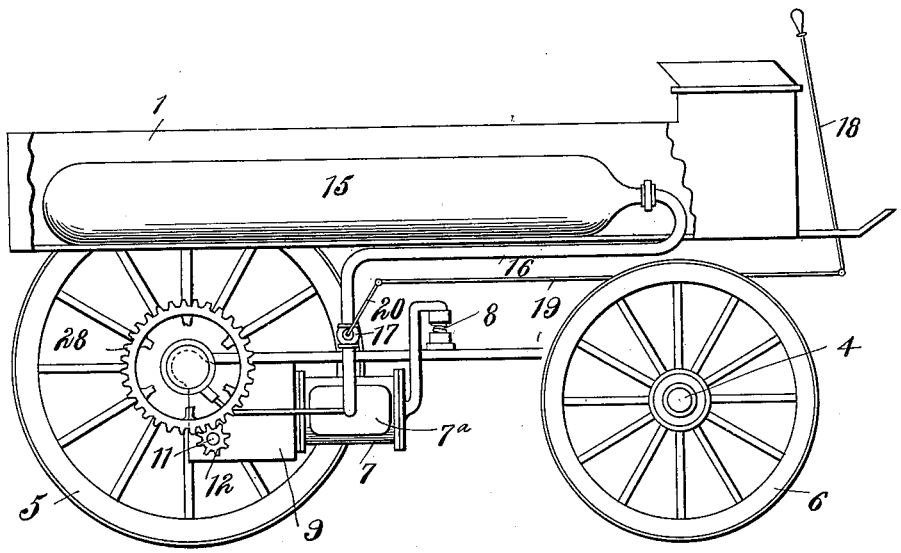
Figure 2:
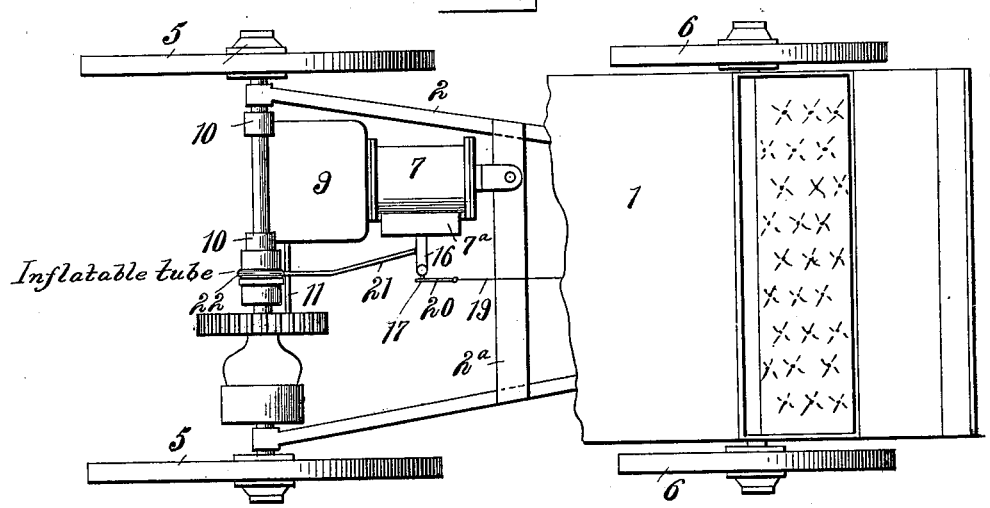

In said drawings, Figure 1 is a side elevation of a motor-vehicle having my improved automatic clutch applied thereto, part of the vehicle being broken away to more clearly show the structure. Fig. 2 is a plan view of the same, part of the body being broken away. Fig. 3 is a detail sectional view of the driving-axle of the motor, showing the clutch engaged. Fig. 4 is a detail view showing the clutch in disengaged position and the inflatable tube collapsed.

1 is a vehicle-body mounted upon a truck-frame 2, which is supported upon the rear driving-axle 3 and the forward axle 4.

5 5 are the rear wheels, and 6 6 are the front wheels.

7 is a fluid-pressure motor supported at its forward end upon the spring 8, mounted upon the arch-bar $2^a$ of the running-gear frame and having a rearwardly-extending dust-proof casing 9, which is supported upon the axle 3 by bearings 10.

11 is a driving-shaft properly geared to the motor within the dust-proof casing 9 and projecting through a dust-proof bearing in one side of the casing and carrying a small gear-wheel 12 at its outer end.

15 is a compressed-air reservoir mounted upon the vehicle-body 1, and 16 is the air-pipe leading from the reservoir 15 to distributing-chest $7^a$ of the motor.

17 is a throttle-valve in the air-pipe 16.

18 is a controlling-lever pivoted at the forward end of the vehicle-body and connected through the rod 19 with the crank-arm 20 of the throttle-valve 17, by means of which the throttle-valve can be opened and closed for starting and stopping the motor.

At a point between the throttle-valve and the distributing-chest of the motor a small pipe 21 communicates with the air-pipe and leads to an inflatable tube 22, surrounding a flanged collar 23, slidingly mounted upon the driving-axle 3.

24 is an abutment secured to axle 3 against one of the bearings 10 for limiting the movement of the flanged collar 23 in one direction, the inflatable tube 22 being supported between the flange or collar 23 and the abutment 24.

25 is one member of the clutch, which is keyed to the driving-shaft 3. 26 is the other member of the clutch, the movable member, which is supported upon or forms a continuation of the hub 27 of a gear-wheel 28.

29 is a ring secured to the axle 3 within the circular recess between the member 26 of the clutch and the axle, and 30 is a spiral spring confined between the collar and ring 29 and the movable member of the clutch.

31 is a collar forming a continuation of the hub 27 on the opposite side, and 32 are ball-bearings supported in the recess in the collar 31 and engaging the flange of the collar 23.

The gear-wheel 28, movable member 26 of the clutch, and collar 31 are in one piece or are secured together in a single structure to slide on the shaft 3.

The gear-wheel 28 meshes with the small gear-wheel 12 on the rear hub of the axle 3 and will be driven by the motor when the clutch is in gear.

The operation is as follows: When the throttle-valve of the motor is opened, the motor will start to operate, and simultaneously with the starting of the motor the compressed air or other fluid will pass through pipe 21 into the inflatable tube 22, which will cause the collar 23 to slide upon the shaft 3, carrying along with it the gear-wheel 28 and movable clutch member 26, causing the closing or engagement of the clutch. This will cause the axle 3 to be rotated by the operation of the motor. When the motor is stopped by the closing of the throttle-valve 17, the pressure in the inflatable tube 22 is immediately reduced, and the spring 30 will cause the clutch to automatically open, collapsing the tube 22 between the collar 23 and abutment 24.

I do not limit myself to the precise structure shown and described and would have it understood that I consider the employment of a piston in a cylinder or a diaphragm in a diaphragm-chamber or other similarly-operating device actuated by the pressure of the motor fluid to be clearly within the scope of my invention, which comprehends the automatic throwing into gear of the clutch by the starting of the motor.

Having thus described my invention, what I claim as new therein, and desire to secure by Letters Patent, is—

1. In combination with a fluid-pressure motor, and an axle to be driven thereby, a normally inactive or disengaged fluid-operated clutch gearing the motor to the axle, and means operated by the fluid-pressure for automatically throwing the clutch into gear when the motor is started, substantially as set forth.

2. In combination with a fluid-pressure motor, and an axle to be driven thereby, a normally-inactive fluid-operated clutch gearing the motor to the axle, and means operated by the fluid-pressure constructed to automatically throw the clutch into gear when the motor is started and adapted to hold the clutch in gear while the motor is running and allow it to disengage when the motor stops, substantially as set forth.

3. In combination with a fluid-pressure motor, and a fluid-reservoir, an axle to be driven by the motor, a normally-inactive clutch gearing the motor to the axle, a throttle-valve controlling the supply of fluid to the motor, and a fluid-pressure device operated by the fluid-pressure upon the opening of the throttle-valve for throwing the clutch into gear, substantially as set forth.

4. In combination with a fluid-pressure motor, and a fluid-reservoir communicating with the motor through a suitable supply-pipe, an axle to be driven by the motor, a normally-inactive clutch gearing the motor to the axle, a throttle-valve in the supply-pipe for controlling the supply of fluid to the motor, and a fluid-pressure-operated device communicating with the fluid-supply pipe of the motor at a point between the throttle-valve and the motor and constructed to automatically throw the clutch into gear upon the starting of the motor, as set forth.

5. In a motor-vehicle, the combination of a motor, and fluid-pressure reservoir communicating with the motor through a supply-pipe, a throttle-valve in the supply-pipe, a normally-inactive clutch on the driving-axle of the vehicle and an inflatable tube communicating with the supply-pipe of the motor and adapted to throw the clutch into engaged position, substantially as set forth.

6. In combination with a fluid-pressure motor, and a fluid-pressure reservoir communicating with the motor through a supply-pipe, a throttle-valve in the supply-pipe, an axle to be driven by the motor, a fixed clutch member on the axle, a loose clutch member held normally disengaged by a spring, an inflatable tube, a stationary abutment for the tube, a movable collar or abutment engaging the movable clutch member and engaged by the inflatable tube, and a pipe communicating between the motor-supply pipe and the inflatable tube, as set forth.

WM. E. GIBBS.

Witnesses:
 HARRY E. KNIGHT,
 M. V. BIDGOOD.